United States Patent

Fujii et al.

[11] Patent Number: 6,078,877
[45] Date of Patent: Jun. 20, 2000

[54] METHOD FOR OPTICALLY TRANSMITTING SIGNALS IN MEASUREMENT UNITS AND MEASUREMENT SYSTEM EMPLOYING THE OPTICAL TRANSMISSION METHOD

[75] Inventors: Masaru Fujii, Kanagawa; Minoru Tanaka, Tokyo, both of Japan

[73] Assignee: Sony Corporation, Japan

[21] Appl. No.: 08/162,893

[22] Filed: Dec. 8, 1993

[30] Foreign Application Priority Data

Dec. 9, 1992 [JP] Japan .................................. 4-329566
Dec. 17, 1992 [JP] Japan .................................. 4-337424

[51] Int. Cl.[7] ...................................................... G01D 5/26
[52] U.S. Cl. ........................... 702/188; 382/141; 382/143; 348/804; 700/108
[58] Field of Search ........................... 364/514; 341/137; 348/804; 358/484; 359/150, 151, 152; 382/143, 141

[56] References Cited

U.S. PATENT DOCUMENTS

| | | | |
|---|---|---|---|
| 4,046,959 | 9/1977 | Watanabe et al. | 178/68 |
| 4,346,478 | 8/1982 | Sichling | 455/612 |
| 4,363,121 | 12/1982 | Schlyter | 370/24 |
| 4,379,226 | 4/1983 | Sichling et al. | 250/231 |
| 4,422,180 | 12/1983 | Wendt . | |
| 4,549,219 | 10/1985 | Sue et al. | 358/257 |
| 4,654,660 | 3/1987 | Siems | 340/870.29 |
| 4,810,891 | 3/1989 | Maschek et al. . | |
| 4,848,923 | 7/1989 | Ziegler et al. . | |
| 4,912,521 | 3/1990 | Almquist et al. | 455/600 |
| 4,972,494 | 11/1990 | White et al. | 382/8 |
| 5,114,227 | 5/1992 | Cleveland, Jr. . | |
| 5,146,357 | 9/1992 | Epstein | 359/152 |
| 5,237,408 | 8/1993 | Blum et al. | 358/108 |
| 5,251,319 | 10/1993 | Wagai et al. | 395/275 |
| 5,315,424 | 5/1994 | Boden et al. | 359/152 |
| 5,355,128 | 10/1994 | Riordan | 340/857.7 |
| 5,359,445 | 10/1994 | Robertson | 359/151 |

FOREIGN PATENT DOCUMENTS

| | | |
|---|---|---|
| 0026930 | 4/1981 | European Pat. Off. . |
| 0053391 | 6/1982 | European Pat. Off. . |
| 0272750 | 6/1988 | European Pat. Off. . |
| 2196202 | 4/1988 | United Kingdom . |
| 2228641 | 8/1990 | United Kingdom . |
| WO 94/12960A1 | 6/1994 | WIPO . |

*Primary Examiner*—Patrick Assouad
*Attorney, Agent, or Firm*—Rader, Fishman & Grauer; Ronald P. Kananen

[57] ABSTRACT

A measurement device includes a measurement unit, a signal processing unit having a serial interface and connected to the measurement unit for processing signals obtained at the measurement unit, and a photocoupler connected to the serial interface of the signal processing unit for converting processed signals into optical information. A measurement system may comprise a plurality of the measurement devices and a method for measuring an object may use the measurement devices.

7 Claims, 7 Drawing Sheets

METHOD FOR OPTICALLY TRANSMITTING SIGNALS IN MEASUREMENT UNITS AND MEASUREMENT SYSTEM EMPLOYING THE OPTICAL TRANSMISSION METHOD

BACKGROUND OF THE INVENTION

This invention relates to a method for optically transmitting signals in measurement units, and a measurement system employing such optical transmission method.

It has hitherto been a normal method in the production process for television receivers or the like to inspect the assembling state using a plurality of measurement devices. For example, when inspecting the assembled state of television receivers by a plurality of measurement devices placed along a belt conveyor, it becomes necessary to transmit information signals between the measurement devices. For such case, it has been customary to perform signal transmission using communication systems having a RS232C or GPIB signal format.

However, such signal transmission makes use of electric cables, and insulation between the measurement devices cannot be achieved, so that there is a risk of circuit destruction due to the difference in the ground potential between the different measurement devices. Besides, connection by electric cables is not desirable because signal transmission by the cable is performed at a site where the noise is likely to be picked up, such as an assembly line.

In addition, it is difficult to raise the information transfer speed with the above enumerated communication systems, so that, if the number of measurement devices connected to the inspection system is increased, it becomes difficult to achieve smooth signal transmission.

SUMMARY OF THE INVENTION

The present invention a novel measurement device and method employing optical fiber communication. The measurement device for executing the present invention translates the information to be measured into optical signals using a photocoupler and a signal processor having a serial interface enclosed therein, and executes transmission of information signals over an optical fiber cable.

According to the present invention, a plurality of the input/output devices, each including a display device and a signal processing device, are interconnected by an optical fiber cable. The measurement device in the present invention may comprise a television camera, in which case an image processing device may be included in the television camera for providing a more compact system.

The measurement device may be further reduced in size by employing an input/output device in which the display device, the signal processing device and the input keyboard are housed integrally. In such case, the measurement device and the input/output device are interconnected by a fiber cable for light transmission.

DESCRIPTION OF THE PREFERRED EMBODIMENTS

Figure 1:
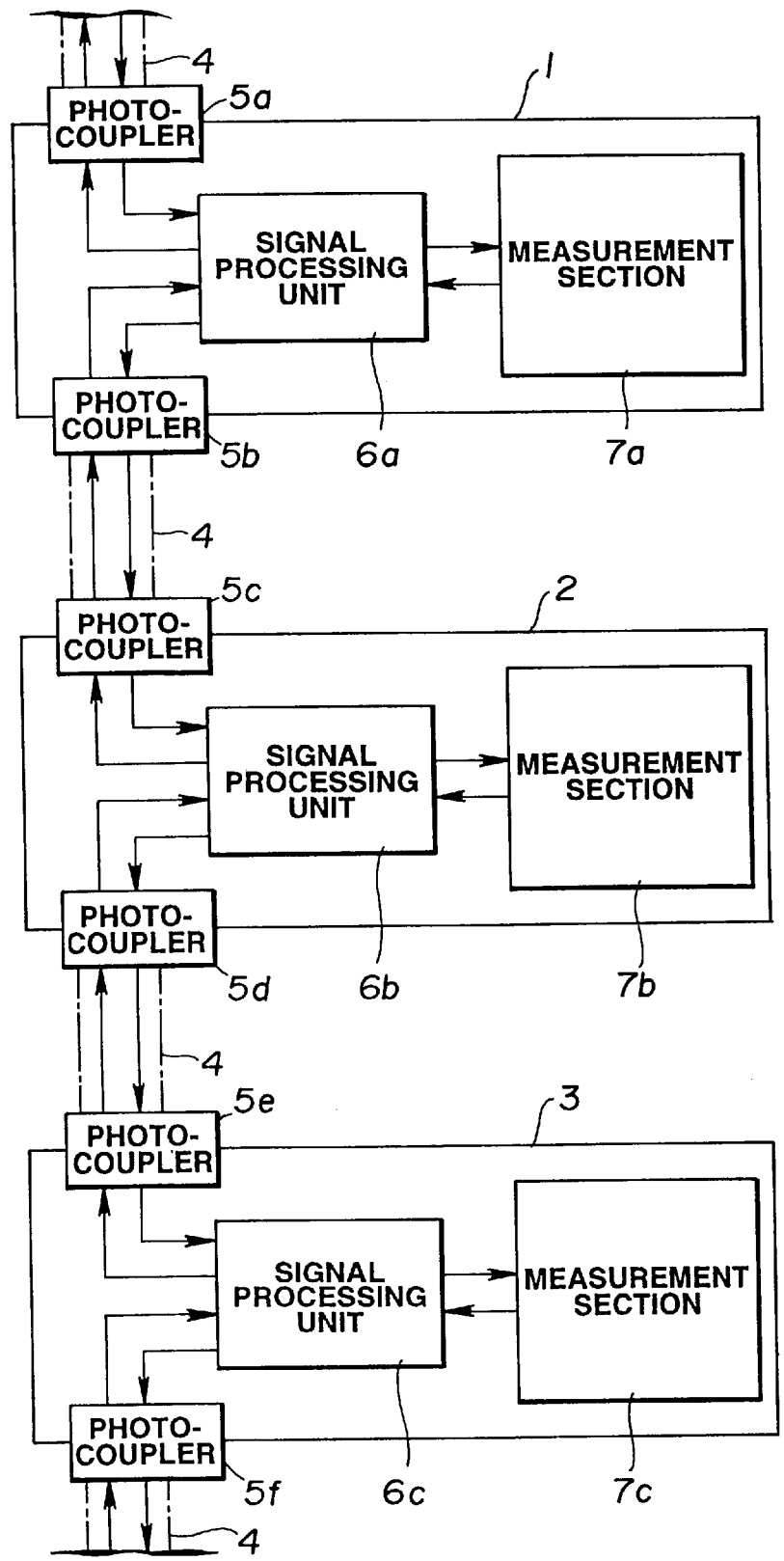
FIG. 1 is a top plan view showing a general layout of signal transmission by plural measurement devices.

Referring to the drawings, illustrative embodiments of the present invention will be explained in detail.

The optical signal communication method with the measurement device according to the present invention is employed for transmission of information signals between plural measurement devices. With the communication method according to the present invention, each measurement device includes a photocoupler and a signal processing unit having an interface enclosed therein. The photocouplers of the measurement devices are interconnected by an optical fiber to execute transmission of the information.

The signal communication method by the measurement device according to the present invention is executed by a signal communication device having measurement units shown in FIG. 1. That is, a plurality of signal processing units 6a, 6b and 6c and a plurality of photocouplers 5a, 5b, 5c, 5d, 5e and 5f are provided in each of a plurality of measurement units 1, 2 and 3.

Figure 2:
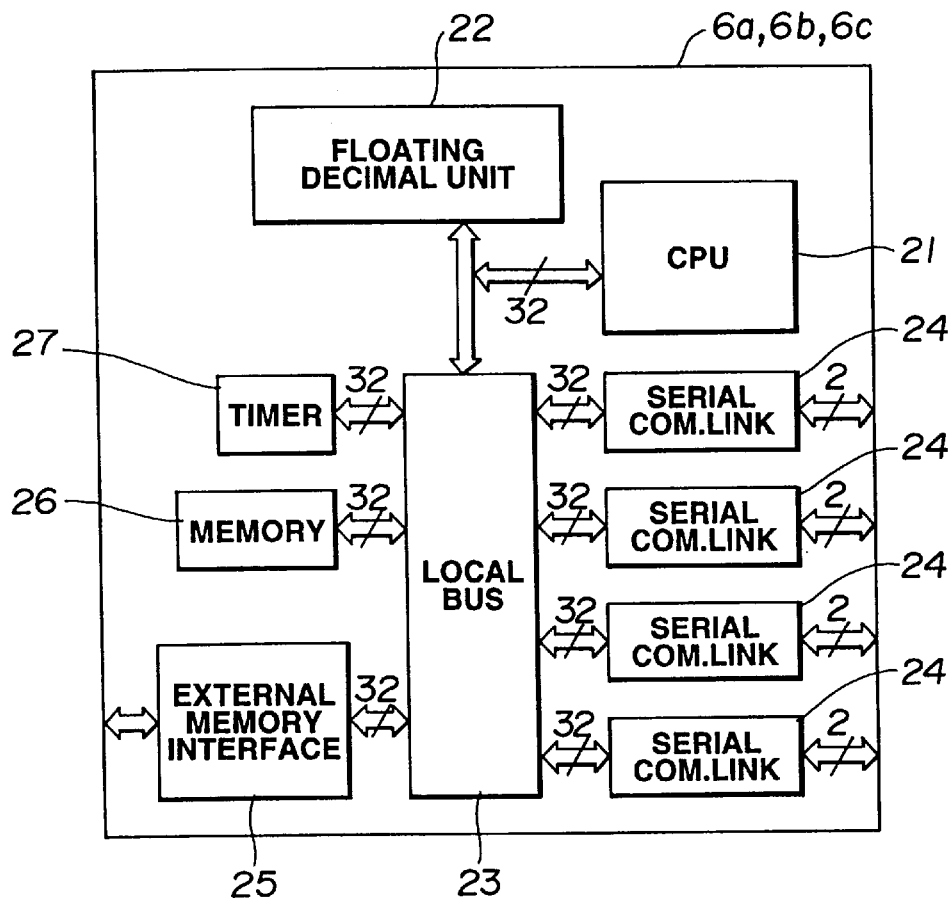
FIG. 2 is a schematic block diagram showing a signal processing device shown in FIG. 1.

Each of the signal processing units 6a, 6b and 6c is a signal processor having a 32-bit central processing unit (CPU) 21, as an example, as shown in FIG. 2. Each of the signal processing units 6a, 6b and 6c has a plurality of serial communication links 24 connected to the CPU 21 by a local bus 23.

Each of the signal processing units 6a, 6b and 6c also includes a memory 26 operated under control by the CPU 21, a timer 27 and an external memory interface 25 connected to an external memory, not shown. Thus it is possible for the CPU 21 of each of the signal processing units 6a, 6b and 6c to have communication of information signals with outside over the local bus 23 and the serial communication links 24. Such communication of the information signals is executed by direct memory accessing (DMA) so that transmission of the information at a rate of 20 M bits/sec is possible by bi-directional communication. For the signal processors 6a, 6b and 6c, a transputer manufactured by SGS Thomson Inc. under the trade name of IMST-805 may be employed.

Figure 3:
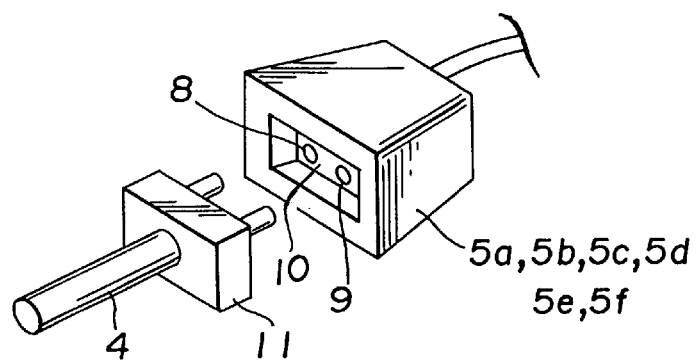
FIG. 3 is a perspective view showing a photocoupler connected to a serial communication link.

The photocouplers 5a, 5b, 5c, 5d, 5e and 5f, shown in FIG. 3, are connected to each serial communication link 24. Each of the photocouplers 5a, 5b, 5c, 5d, 5e and 5f includes a light emitting section 8 made up of a light emitting diode or a laser diode, and a light receiving section 9 formed by a photodiode or a phototransistor. The light emitting section 8 emits light in a pulsed fashion responsive to digital information signals transmitted from the CPU 21 via the serial communication links 24. The light receiving section 9 receives the light transmitted from outside for translation into digital information signals which are supplied over the serial communication links 24 to the CPU 21.

The light emitting section 8 and the light receiving section 9 are arranged in a socket 10 provided on the front side of a casing member. An optical fiber 4 is coupled via a plug 11 to the socket 10. The photocouplers 5a to 5f execute information transmission, at the above-mentioned rate of 20 M bits/sec, using the non-return to zero (NRZ) code for the transmission signals.

The signal processors 6a, 6b and 6c are connected to measurement sections 7a, 7b and 7c, respectively. A variety of functions may be associated with the measurement sections 7a, 7b and 7c. For example, it is possible for the measurement sections 7a to 7c to measure the length or weight or to capture an image and to exchange signals with the signal processors 6a to 6c connected thereto. That is, the measurement sections 7a to 7c are controlled by control signals from the signal processors 6a to 6c and the measured results are transmitted to the signal processors 6a to 6c.

In this manner, the signal processor 6a, photocouplers 5a, 5b and the measurement section 7a make up the measurement unit 1, while the signal processor 6b, photocouplers 5c, 5d and the measurement section 7b make up the measurement unit 2 and the signal processor 6c, photocouplers 5e, 5f and the measurement section 7c make up the measurement unit 3. Although a sole signal processor and a sole measurement section are included in FIG. 1 in a measurement unit, there may be occasions where a plurality of signal processors and measurement sections are provided in one measurement unit.

Figure 4:
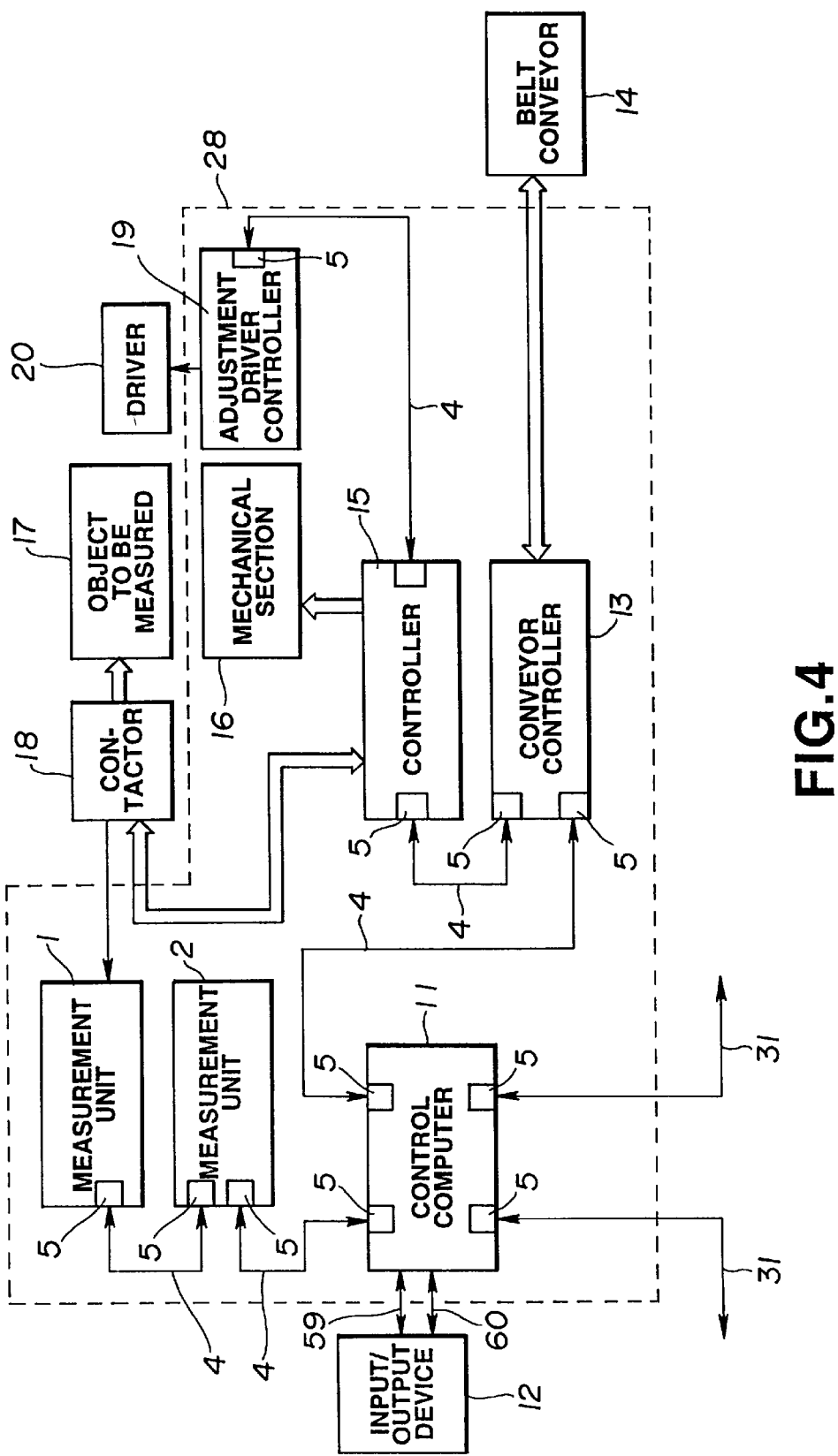
FIG. 4 is a schematic block diagram showing a second embodiment of the measurement device shown in FIG. 1.
Figure 5:
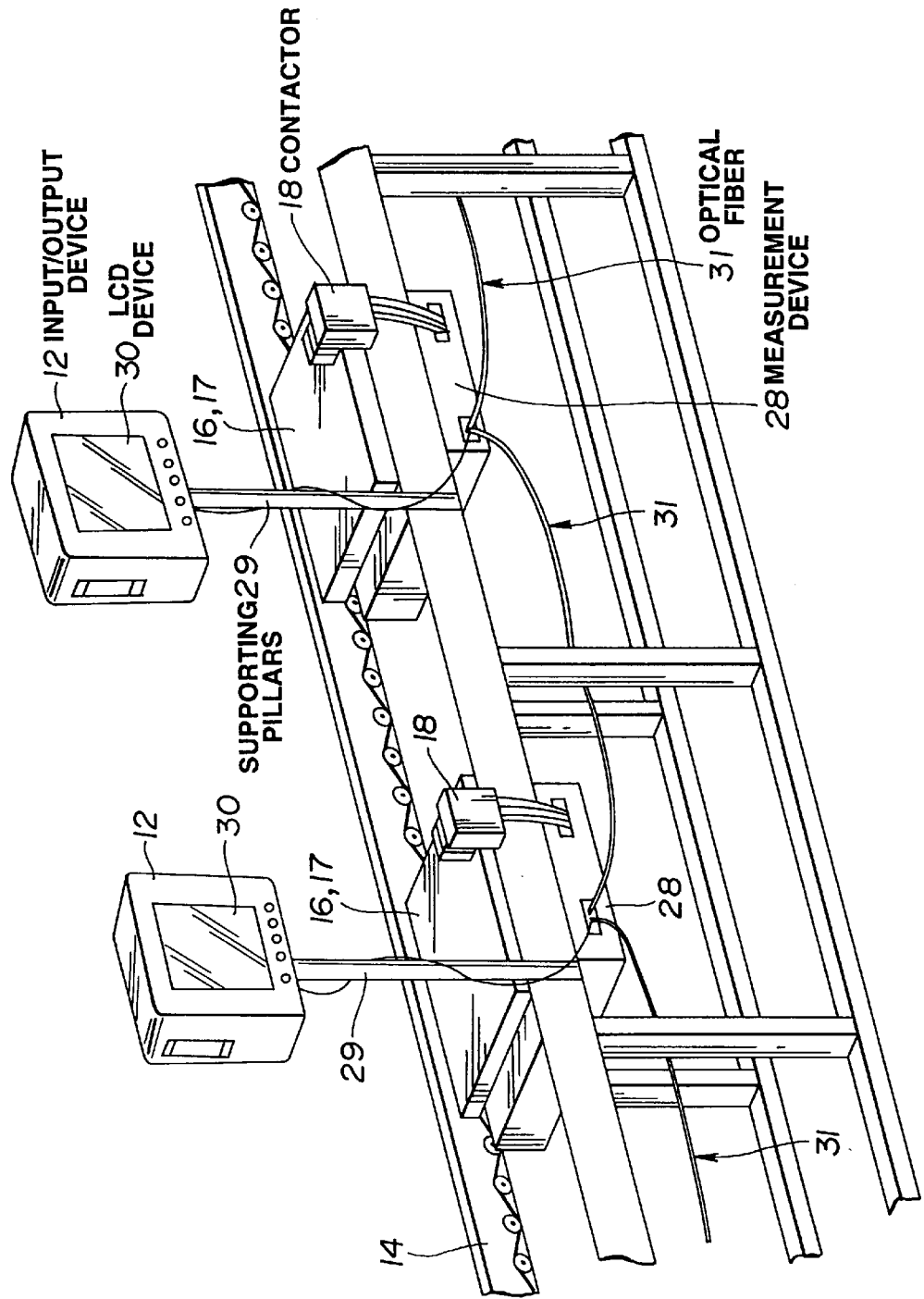
FIG. 5 is a partial perspective view showing a measurement system employing plural measurement devices.

A measurement device 28 employing the above-mentioned measurement units is shown in FIGS. 4 and 5. That is, the measurement device 28 includes a control computer 11 and, in an embodiment shown in FIG. 4, the measurement units 1 and 2 are connected via the optical fiber 4 to the control computer 11. The control computer 11 includes an input/output device 12 and a contactor 18 connected to the measurement section of the measurement unit. The input/output device 12 includes an indicator and a keyboard, not shown.

A plurality of the measurement devices 28 are incorporated into a production line, as shown in FIG. 5. A plurality of the input/output devices 12 are mounted on supporting pillars 29. Each of the input/output devices 12 includes a liquid crystal display device (LCD) 30. A plurality of the contractors 18 are connected to a plurality of objects to be measured 17, while being connected to the measurement devices 28 by flexible cables.

The measurement devices 28 are employed for such a case in which the objects to be measured 17, each placed on a palette transported on a belt conveyor 14, are assembled while measurement operations are performed thereon. Meanwhile, a mechanical section 16 includes an electric motor and a plunger for controlling the palette. The measurement devices 28 are supported on the bottom of the belt conveyor 14 and arrayed along the belt conveyor 14. The measurement devices 28 are interconnected by an optical fiber 31 for signal transmission between the measurement devices 28.

Referring to FIG. 4, the measurement device 28 includes a conveyor control section 13 connected to the control computer 11 by the optical fiber 4 for controlling the movement of the belt conveyor 14. Besides, the conveyor control section 13 is connected to a controller 15 by the optical fiber 4. The controller 15 controls the contactor 18, mechanical section 16 and an adjustment driver controller 19 which controls a screw driver 20 adapted for adjusting an adjustment screw of the object to be measured 17.

Meanwhile, the serial communication link shown in FIG. 2 is enclosed within each of the control computer 11, conveyor control section 13 and the adjustment driver controller 19 for enabling light communication at a rate of 20 M bits/sec.

Figure 6:
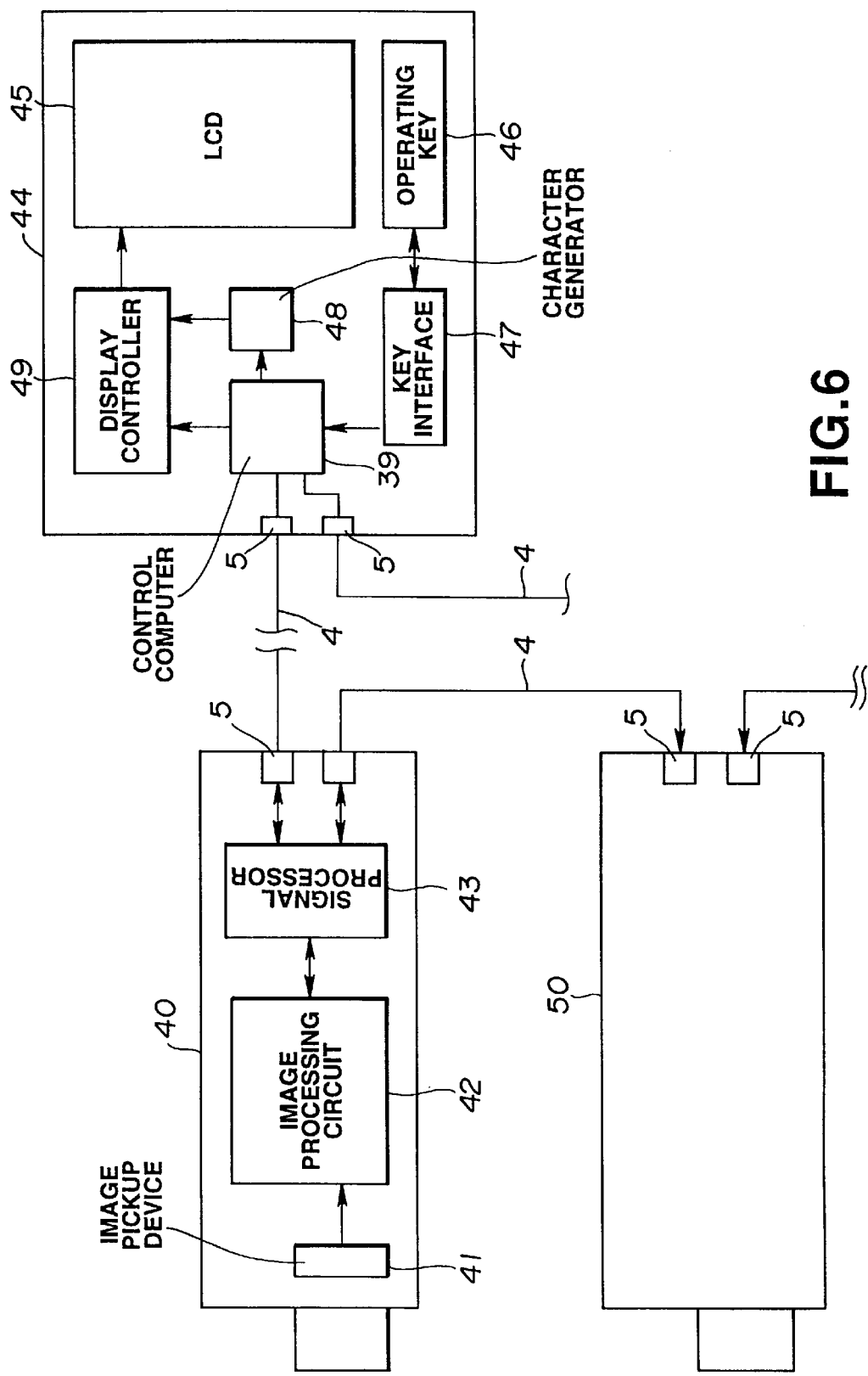
FIG. 6 is a schematic block diagram showing a third embodiment of the measurement device.

FIG. 6 shows a modification in which the control computer 11 shown in FIG. 5 is integrally formed with the input/output device 12. That is, an input/output device 44 includes a control computer 39 therein and an operating key 46 connected to the control computer 39 via a key interface 47. The control computer 39 controls a display controller 49 to cause an image to be displayed on an LCD 45 along with an output of character generator 48.

As explained in connection with FIG. 4, a signal processor having a serial interface enclosed therein is included in the control computer 39 for having communication with the outside via the photocoupler 5. A cathode ray tube (CRT) may naturally be employed in place of the LCD 45.

In an embodiment shown in FIG. 6, a television camera 40 is employed as a measurement device. The television camera 40 includes an image pickup device 41, an image processing circuit 42 including an A/D converter, and a signal processor 43. The signal processor 43 naturally corresponds to the signal processor shown in FIG. 2 and includes a serial communication link. Thus the video signals produced by the image pickup unit 41 are translated by the image processing circuit 42 into digital signals which are transmitted from the photocoupler 5 to the control computer 39 of the input/output device 44 via the optical fiber 4.

Figure 7:
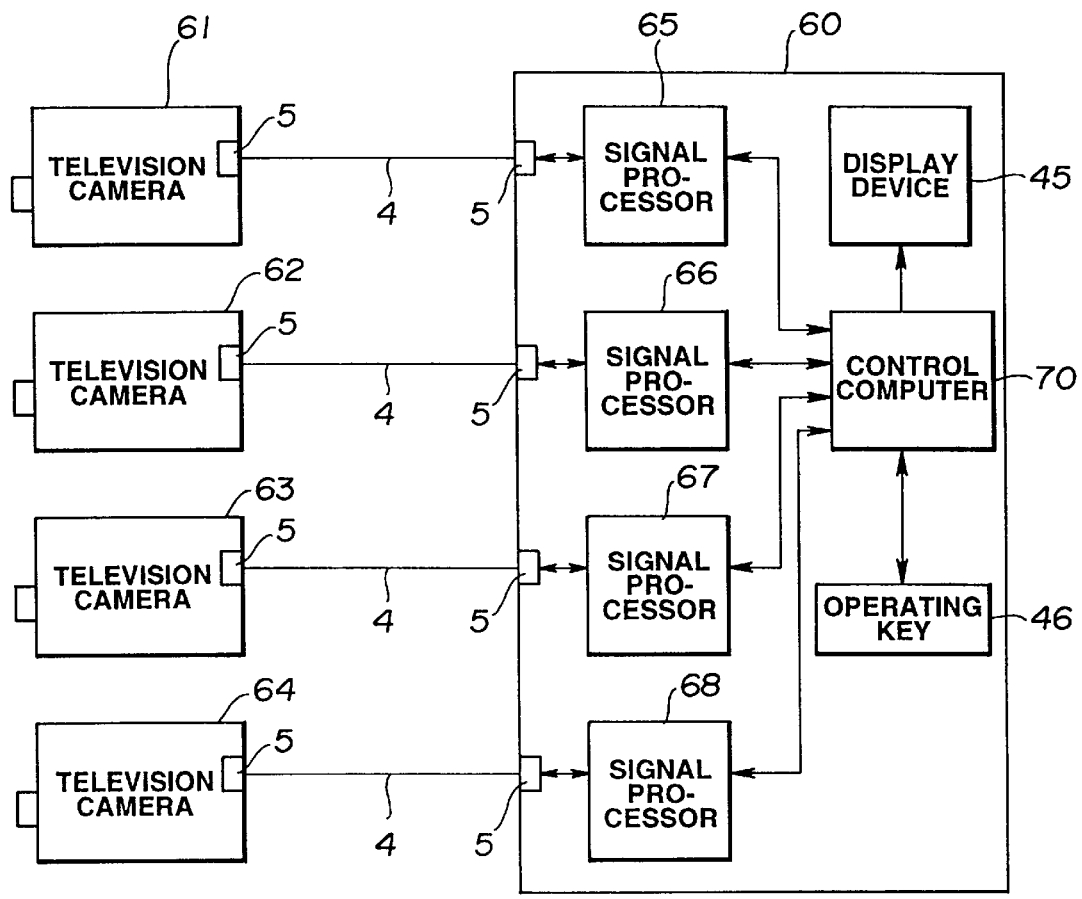
FIG. 7 is a schematic block diagram showing fourth embodiment of the measurement device.

In the embodiment shown in FIG. 6, outputs of plural television cameras 40, 50 are sequentially processed in a pre-set manner by the control computer 39. High-speed image processing may be achieved by providing plural signal processors 65, 66, 67 and 68 in the input/output device 60 as shown in FIG. 7 for parallel processing of digital video signals from television cameras 61, 62, 63 and 64. These signal processors 65 to 68 are connected to a control computer 70 for processing the signals in accordance with the control information from the operating key 46. The results of the processing are displayed on a display device 45.

Figure 8:
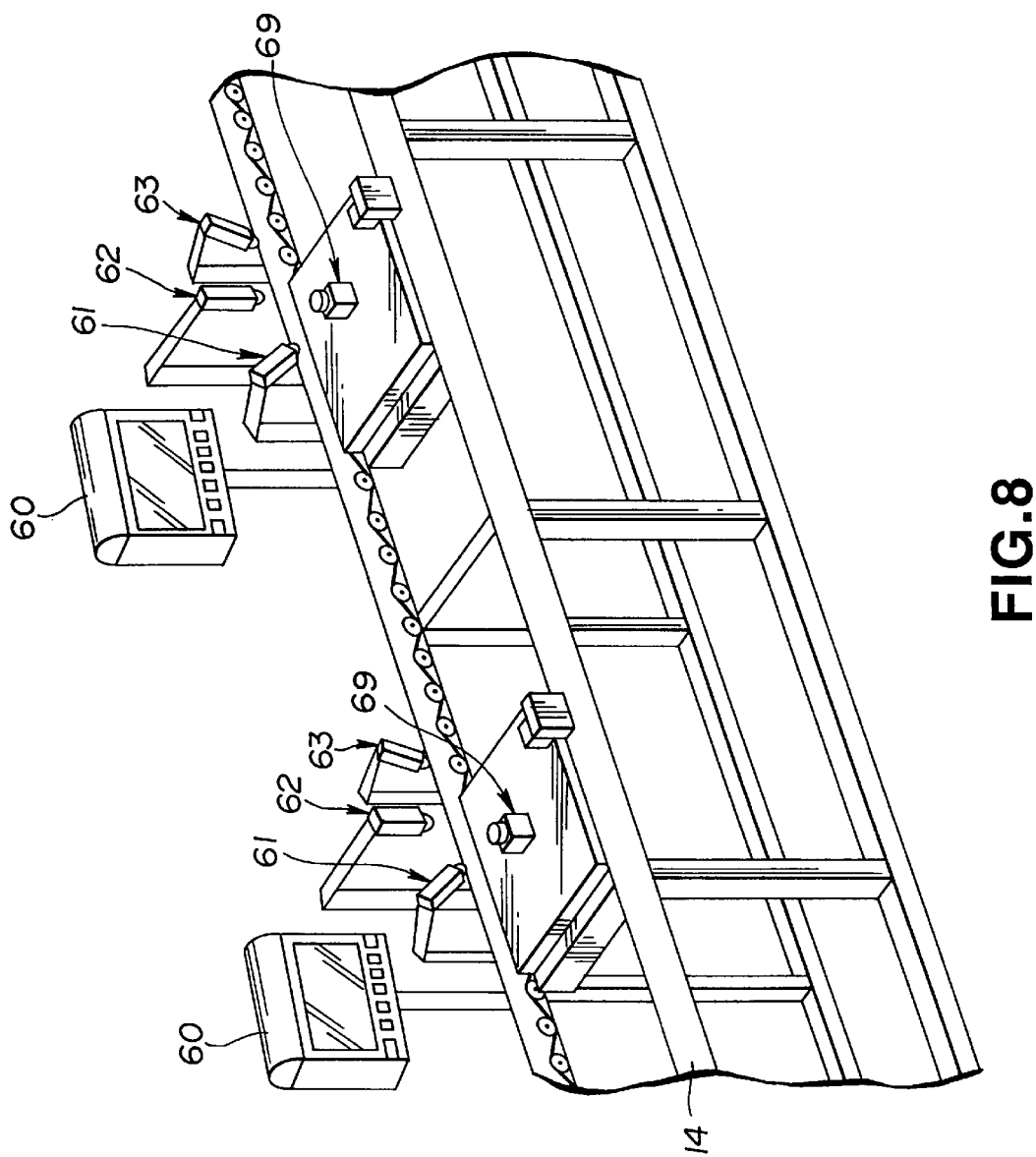
FIG. 8 is a partial perspective view showing a measurement device according to the fourth embodiment of the invention.

If a plurality of television camera are employed in this manner, the present invention is employed on the production line as shown in FIG. 8. That is, a plurality of the television cameras 61, 62 and 63 are arranged along the belt conveyor 14. These television cameras 61 to 63 are arranged for imaging a sole object 69 from different angles. The results of measurement are processed by the input/output device 60 having the image processing unit enclosed therein.

What is claimed is:

1. A measurement device for use in a production line for acquiring data on objects travelling along a conveyor belt, said measurement device being located at each of a plurality of spaced locations along said conveyor belt and comprising:

a measuring unit located at each of said spaced locations along said conveyor belt for acquiring data on each of said objects travelling along said conveyor belt and for generating signals indicative of said data;

a signal processing unit located at each of said spaced locations along said conveyor belt and connected to a respective measuring unit, said signal processing unit for processing signals obtained from said measuring unit and having a serial interface and a photocoupler connected to said serial interface of said signal processing unit for converting processed signals into optical information signals;

optical fibers for interconnecting the photocouplers in the signal processing units to each other and for conducting the optical information signals between signal processing units;

a control computer coupled to one signal processing unit via the photocoupler and an optical fiber associated with the one signal processing unit, said control computer for processing the optical information signals from the signal processing units;

display device coupled to said control computer for displaying results of processing from said control computer; and a conveyor controller having a photocoupler coupled to said control computer by an optical fiber, said conveyor controller controlling movement of said conveyor belt.

2. The measurement device as set forth in claim 1, further comprising a second controller connected to said conveyor controller and to a contactor, said contactor being controlled by said second controller and is for contacting the objects travelling along said conveyor belt.

3. The measurement device as set forth in claim 2, wherein said second controller has a photocoupler which is coupled to the photocoupler of said conveyor controller by an optical fiber which transmits optical information signals between said second controller and said conveyor controller.

4. The measurement device as set forth in claim 2, wherein said second controller is further connected to a mechanical section for controlling a pallette upon which one of said objects is placed.

5. The measurement device as set forth in claim 2, wherein said second controller is further connected to a driver controller for controlling a driver that adjusts an adjustment screw of each one of the objects.

6. A method of transmitting measurement data from a plurality of spaced location along a conveyor belt to a signal processor, comprising the steps of:

measuring desired information of an object at each of said spaced locations along said conveyor belt;

converting the desired information thus obtained at converting the desired information thus obtained at each of said spaced locations into serial signals;

converting said serial signals into optical information signals; and transmitting the optical information signals from each of said spaced locations to the signal processor by a fiber optical cable;

wherein said step of transmitting the optical information to the signal processor comprises the steps of transferring said optical information from one spaced location to an adjacent spaced location sequentially along said conveyor belt.

7. A method of transmitting measurement data from a plurality of spaced location along a conveyor belt to a signal processor, comprising the steps of:

measuring desired information of an object at each of said spaced locations along said conveyor belt;

converting the desired information thus obtained at converting the desired information thus obtained at each of said spaced locations into serial signals;

converting said serial signals into optical information signals; and transmitting the optical information signals from each of said spaced locations to the signal processor by a fiber optical cable;

wherein said step of transmitting the optical information to the signal processor comprises the steps of transferring said optical information from each spaced location directly to the signal processor along a dedicated optical fiber cable.

* * * * *

UNITED STATES PATENT AND TRADEMARK OFFICE
CERTIFICATE OF CORRECTION

PATENT NO. : 6,078,877
DATED : June 20, 2000
INVENTOR(S) : MASARU FUJII et al.

It is certified that error appears in the above-identified patent and that said Letters Patent is hereby corrected as shown below:

Column 6, lines 1 to 3, claim 6, lines 6 to 8, should read;

- -converting the desired information thus obtained at each of said spaced locations into serial signals;- -

Column 6, line 19 to 21 et seq., claim 7, line 6 to 8, should read;

- -converting the desired information thus obtained at each of said spaced locations into serial signals;- -

Signed and Sealed this

Tenth Day of April, 2001

Attest:

NICHOLAS P. GODICI

Attesting Officer     Acting Director of the United States Patent and Trademark Office